United States Patent

[11] 3,607,491

| [72] | Inventor | Ed Caldwell Brown |
| | | Hartville, Ohio |
| [21] | Appl. No. | 877,037 |
| [22] | Filed | Nov. 14, 1969 |
| [45] | Patented | Sept. 21, 1971 |
| [73] | Assignee | The General Tire & Rubber Company |
| | | Akron, Ohio |

[54] FLEXIBLE POROMERIC SHEET MATERIAL WITH A SUEDE FINISH
15 Claims, No Drawings

| [52] | U.S. Cl. | 156/77, 161/159 |
| [51] | Int. Cl. | B32b 5/18 |
| [50] | Field of Search | 156/77, 247; 264/46; 161/159 |

[56] References Cited
UNITED STATES PATENTS

| 3,284,274 | 11/1966 | Hulslander et al. | 156/77 X |
| 3,312,586 | 4/1967 | Barlow | 161/159 X |
| 3,418,198 | 12/1968 | Einstman | 156/77 X |
| 3,524,791 | 8/1970 | Bethman et al. | 161/159 X |
| 3,536,572 | 10/1970 | Murphy et al. | 161/159 X |

*Primary Examiner*—Carl D. Quarforth
*Assistant Examiner*—S. Hellman
*Attorneys*—Frank C. Rote, Jr., John J. Murphey and Denbigh S. Matthews

ABSTRACT: This invention is a process of making a flexible poromeric sheet material with a suede finish and the product produced by this process. A phase-invertible polymer solution, comprising an extended urethane polymer, a polyvinyl chloride resin, and a water-miscible solvent, is cast in a film onto a solid surface and phase-inverted in a water bath, containing a surface-active agent, to form a three-layered material comprising a skin layer adjacent the solid surface, a poromeric suede layer loosely bound to the skin layer, and a substantially smooth poromeric anchoring layer atop and integral with the suede layer. The product is removed from the surface and the skin layer removed from the suede layer to reveal a flexible poromeric sheet material with a suede finish.

FLEXIBLE POROMERIC SHEET MATERIAL WITH A SUEDE FINISH

BACKGROUND OF THE INVENTION

1. Field of the Invention

This invention relates to the field of flexible sheet materials. More particularly, this invention relates to poromeric flexible sheet materials with special finishes and to a process of making such a material with a suede finish.

2. Description of the Prior Art

A "suede" is defined in Webster's Dictionary as, "a tanned skin with the flesh side rubbed to a nap," and "a fabric prepared so as to simulate the surface of such a tanned skin." This latter definition describes a synthetic suede and is the subject of this invention.

Most suede articles or articles having suede finishes exist as flexible sheet materials. They find many uses in everyday wearing apparel such as shoe coverings, coat cuffs, and gloves. These materials may contain decorations in addition to the pleasing suede surface such as fancy stitching, stitched ribs, and perforations.

Natural suede finished materials (i.e. animal hides) have the very desirable property of being poromeric, i.e. the materials contain many fine interconnected openings or pores that permit escape of water vapor such as perspiration from the wearer. However, these natural materials vary in strength, flexibility, color, tone, etc. depending upon the animal's environment and the hide recovery process and these variations require much cross matching between pieces to insure product uniformity. Hides of well-fed and poorly fed animals differ in thickness and strength. Skin abrasions, insect bites, and bacterial maladies incurred by the growing animal cause defects and/or color changes in the hides. Slight variations in skiving technique and in slit knife setting produce hides of varying thickness and hand. Capping all these variations is the limitation in the usable size of the hide; there just isn't any way of obtaining a continuous sheet of natural hides short of sewing them together which usually produces unsightly seams.

There are processes already known in the flexible sheet material art of making suede-finished materials. For instance, it is known that casting a plastisol resin in a layer onto a surface containing many fine particles (e.g. sandpaper), applying a flexible cover layer to the plastisol, heating the plastisol to gel and fusing it and adhering it to the cover layer, and then stripping it from the fine-particle surface will produce a flexible sheet material with a suede finish (U.S. Pat. No. 3,312,586). It is also known that casting a phase-invertible polymer solution in a film onto a solid surface and phase-inverting the polymer solution in a liquid that is miscible with the solution solvent and a nonsolvent for the polymer will produce a poromeric material, after the smooth top layer is buffed away, that has a suede finish (U.S. Pat. No. 3,284,274).

The suede-finished materials produced by these processes are difficult to emboss. It is many times too expensive to make a decorative embossed surface with a fine particle finish. In addition, post embossing of suede-finished materials tends to produce densification or "shine" on the suede in the area of greatest embossing pressure. With poromeric suede-finished materials, post embossing has a deteriorating effect upon moisture transmission rate as well as producing a "shine" on the surface.

This invention is the discovery of a process of making a flexible poromeric sheet material with a suede finish that does not require the step of buffing away a layer to produce the suede layer. Moreover, the suede-finished material produced by this invention is amenable to embossing without the associated problem of densification or "shining."

Therefore, the main objects of this invention are a process of making a poromeric material with a suede finish and the material produced by this process. Other objects include a process of making a flat or embossed poromeric suede-finished material; a process that is inexpensive to practice; a process that is operable with existing process equipment; a process that is amenable to high production rates and automatic and semiautomatic control; and a suede-finished product that may be laminated with fabrics or used unsupported.

SUMMARY OF THE INVENTION

This invention concerns a process of making a flexible poromeric sheet material with a suede finish comprising the steps of casting a film of a phase-invertible polymer solution, comprising an extended urethane polymer, a polyvinyl chloride resin, and a water-miscible solvent, onto a solid surface, phase-inverting the film of polymer solution in a liquid, comprising a major amount of water and containing from about 0.5 percent to about 25 percent by weight of a surface-active agent, to form a three-layered material comprising a skin layer adjacent the solid surface, a poromeric suede layer loosely bound to the skin layer, and a poromeric anchoring layer atop and integral with the suede layer, removing the three-layered material from the surface, removing the skin layer from the suede layer to leave a two-layered poromeric material with a suede finish, and then drying the material. This invention also concerns the product produced by this process.

DESCRIPTION OF THE PREFERRED EMBODIMENT

The basic process of this invention comprises the following four steps: casting a film of polymer solution, phase-inverting the film in a liquid comprising a major amount of water and containing a surface-active agent, removing the material from the surface and removing the loosely bound skin therefrom, and drying the material. Other separate embodiments of the basic process produce poromeric suede-finished materials having other characteristics and these embodiments will be described later.

The main ingredient used in process of this invention, to produce the flexible poromeric suede-finished sheet material, is a solution of a chain extended urethane polymer and a polyvinyl chloride resin in a water-miscible solvent known in the plastics art as a "phase-invertible" polymer solution. The polymers are blends of a homopolymer of vinyl chloride and a polyester or polyether urethane; the urethane is the reaction product of a polymeric polyester or polyether and a polyisocyanate that is chain extended with an organic amine. The solvent is a water-miscible liquid such as dimethyl formamide or tetrahydrofuran. The solution is termed "phase-invertible" because, when cast in a film and immersed in a liquid that is miscible with the solution solvent but a nonsolvent for the polymers, the polymers are said to "phase-invert" or coagulate into a flexible matrix containing many small interconnected openings or pores through which moisture may pass and which give the name "poromeric" to the dried product.

The first step in the process of this invention is to cast a film of the above-described solution onto a solid surface. This may be done in a number of ways such as knife blade coating, using a drawbar, brushing, or extruding. The requirement is that a smooth film of even gauge of liquid be applied to the surface. The gauge or thickness of the cast liquid film is termed the "wet gauge"; the gauge of the phase-inverting film is less and is termed the "dry gauge." This casting step is easily accomplished in a continuous process where a conveyor belt could be situated under a doctor blade to accept a film of polymer solution to be transferred to the next process step. The term "film" is used herein to indicate a layer, pellicle, or coating of liquid and its use is to differentiate it from the three-layered material produced therefrom. It is not to be inferred from the term "film," however, that the deposit of solution is very thin; as will be seen in the examples, this "film" may vary in thickness from a few thousandths of an inch to more than one-sixteenth of an inch. The flexible poromeric sheet material with a suede finish, produced from the process of this invention, is just that: it is a flexible (in contrast to solid), poromeric (in contrast to impervious or spongy), sheet material (in contrast to bar stock, powder, liquid, etc.) with a suede finish on one side only—the underside of the film as viewed from above the solid surface.

The thickness or wet gauge of the cast film of solution is determined in part by the desired final thickness or dry gauge of the material and in part by the concentration of polymer in the solution. For a change in the desired dry gauge of the material, one may either vary the concentration of the solution or the thickness (wet gauge) of the film, the latter variable is many times the more easier accomplished especially in a continuous process. Poromeric suede-finished materials have been made by this inventive process as thin as 0.015 inches (15 mils) and as thick as 90 mils; the only apparent limits are the loss of suede structure when the film is too thin and shrinkage along the edge of the cast film when it is too thick.

The viscosity of the polymer solution affects the conditions under which the polymer is cast and the method of casting the film. For blade coating or extruding the layer, the viscosity should range between about 10,000 to about 75,000 centipoise with the optimum range being between 20,000 to 30,000 centipoise. As these two methods of casting the film are the most widely used, further consideration of the viscosity is not warranted except to say that the viscosity of the solution may be adjusted to almost any desired value by heating or cooling, i.e. a high-viscosity solution may be substantially thinned by gently heating it; conversely, a low-viscosity solution may be substantially thickened by cooling it.

The solid surfaces contemplated in this process comprehend virtually any solid surface including the surfaces of releasable carriers, glass plates, rubber sheets, polyolefin belts, metal molds, and wood planks. The descriptive term "solid" is used to differentiate this surface; the term is not used to means unyielding surfaces for they, such as polyolefin belts, etc., are in many cases the most desirable solid surfaces upon which to cast the film of polymer solution.

For best results, the solid surface should be free of deep crevices and undercuts and other gross elevational irregularities, however, decorative surfaces such as embossed surfaces are fully comprehended in this invention. Indeed, one of the meritorious features of this invention is that the suede-finished material of this invention may easily be made with an embossed design and such design will not have the problems of loss of moisture vapor transmission rate and shine that occur with poromeric suedes of the prior art.

When a solid surface of a releasable carrier is used, the skin layer (to be more fully described later) will usually not adhere to it but will stick to the suede layer and this skin layer must be subsequently removed from the suede layer. This use, however, of a releasable carrier permits the carrier to be reused immediately to accept another cast film of polymer solution such as in a continuous process. When a nonreleasable carrier is used, the skin layer sometimes sticks to the solid surface so that the suede-finished material is free of the skin layer as soon as it is removed from the solid surface and thus is ready to be dried. This, however, necessitates the extra step of removing the skin layer from the solid surface; if the surface is substantially smooth, such an operation is rather simple—the degree of simplicity decreasing with increasing complexity of the surface.

This invention also contemplates the use of release agents applied to nonreleasable solid surfaces, prior to casting the film of polymer solution thereon, to aid in the later removal of the skin layer from the solid surface. Examples of these release agents include silicone oils, high molecular weight soaps, and waxes.

The next step in the process is to phase-invert the polymer solution and produce a flexible poromeric sheet material. As is well-known in the art, this procedure produces a polymer matrix containing many, very small interconnected openings or pores which later serve to pass water vapor through the material. The phase-inversion step of this process is accomplished by placing the cast film into a liquid comprising a major amount of water and containing from about 0.5 percent to about 25 percent by weight of a surface-active agent. The water combines with the water-miscible solvent and removes the solvent from the solution to leave behind the urethane and polyvinyl chloride polymers in an established poromeric matrix.

The surface-active agent in the liquid appears to cause formation of a skin layer (of polymer) adjacent the solid surface that is easily removed from the phase-inverted film to reveal a suede finish on the poromeric material. Without the surface-active agent present in the phase inversion liquid, the skin layer will not form and the smooth surface (either one) of the finished material must be abraded away, by rubbing, skiving, etc., to reveal the suede layer. This use of a surface-active agent in the phase-inversion liquid, to produce the easily removable skin layer, is the basic point of novelty in this invention—its use has not been known before in this type of process.

The type of surface-active agent usable in the process of this invention comprehends those of the nonionic, anionic, cationic, and amphoteric classes with the nonionic and anionic classes preferred. Examples of the nonionic class of surface-active agents are octyl phenoxy polyethoxy ethanol having 9-10 moles of ethylene oxide adducted thereto, and polyoxyethylene sorbitan monoleate with an adduct of 10 moles of ethylene oxide. Examples of the anionic class of surface-active agents include sodium dioctyl sulfosuccinate and sodium dodecyl benzene sulfonate. Examples of the cationic class of surface-active agents, although not the preferred class of surface-active agents, include cetyl trimethyl ammonium bromide and cetyl dimethyl amine oxide. Examples of the amphoteric class of surface-active agents, although not the most desirable class of agents, include the sodium salt of a stearic acid substituted quaternary hydroxycycloimidine acid alcoholate and N-coca beta amino butyric acid.

Generally, the concentration of surface-active agent in the phase-inversion liquid may be varied from about 0.5 percent to about 25 percent by weight of the liquid. However, each surface-active agent has a concentration range in which will be produced the best quality poromeric suede-finished material for that agent. For example, in the case of a nonionic silicone-based surface-active agent such as a copolymer of polydimethyl siloxane and polyoxyalkylene, made by Union Carbide Corporation and sold under the trademark of L-540, a concentration from about 0.5 percent to about 25 percent by weight produces an acceptable material while a concentration from about 0.5 percent to about 8 percent produces an extremely good material.

The amount of time the film is exposed to the phase-inversion liquid containing the surface-active agent, is known as the "dwell" time. The dwell time may be varied to achieve proper development of the suede finish depending upon the temperature at which the phase-inversion is conducted and the thickness of the cast film of polymer solution. The time-temperature relationship is such that, at a constant wet gauge, the phase-inversion may be accomplished in lesser time at a higher temperature or at a longer time period at a lower temperature; it appears that the temperature affects the mobility of the water to remove the water-miscible solvent from the cast film. Generally speaking, the temperature of the liquid may be varied from just above freezing to just below boiling, however, for each surface-active agent, there appears a temperature range in which is produced the best quality suede-finished material. For example, when using the aforementioned surface-active agent L—540, usable poromeric suede-finished materials may be produced in a liquid having a temperature between about 40°–120° F. with an exceptionally good poromeric suede-finished material produced between the temperature of 70°–100° F. for a dwell time of about 5 minutes. The time-temperature relationship that will produce the best quality poromeric suede-finished material by this process may therefore be easily established for each type of surface-active agent.

The liquid in which the phase-inversion takes place may contain materials in addition to the major amount of water and the surface-active agents. For example, the liquid may contain the water-miscible solvent from the phase-invertible solution that is cast in a film over the solid surface. In addition, the liquid may contain other water-miscible components such as ethyl alcohol and methyl alcohol. The amount of water-miscible solvent carried over into the liquid from the phase-invertible solution is tolerable at concentrations below about 18 percent by weight of the liquid. Above this level the skin layer becomes more difficult to remove from the three-layered flexible sheet material developed in the phase-inversion step. It is theorized that high concentrations, e.g. greater than 18 percent of water-miscible solvent in the phase-inversion liquid impairs the mobility of the water and surface-active agent in phase-inverting the solution and developing the skin layer adjacent the substrate. When this process is practiced on a continuous scale, the buildup of water-miscible solvent in the phase-inversion liquid should be closely monitored.

The flexible sheet material produced in this phase-inversion step comprises, in the following order starting at the solid surface, a skin layer adjacent the surface, a poromeric suede layer loosely bound to the skin layer, and a poromeric anchoring layer atop and integral with the suede layer. This three-layered material is removed from the solid surface, inverted, and the skin layer peeled away to reveal a two-layered, flexible poromeric sheet material comprising a poromeric suede layer integrally anchored to a substantially smooth poromeric anchor layer.

The suede finish comprises a series of closely packed, elongated, tubular-shaped cells extending perpendicular from the anchor layer. The exposed ends of the cell walls terminate substantially in a plane that is parallel to the plane of the anchor layer, except where there is an embossed design, so that the suede has a smooth finish. The cell walls are an integral part of the anchor layer so that the anchoring layer and the suede finish act in concert to provide a hard wearing material.

Although the material produced by the process of this invention may be described in terms of thickness, density and other physical properties, the appearance of the suede finish is purely a matter of subjective determination. The skin layer is judged as to tightness-looseness, i.e. ease of removability (ease in peeling) and the suede finish is judged as to appearance of the cells, i.e. too fine or too dense to look like suede, medium—a good looking suede, or too coarse and splotchy to look like suede. The best combination of skin layer and suede layer is a skin layer that is loose and removable by hand (i.e. by peeling) and a medium-sized cell, good suede appearing finish.

The next steps in the process are to remove the material from the solid surface, invert it, remove the skin layer, and dry the material. These steps are very simple and straightforward. The three-layered sheet material, produced in the phase-inversion step, is easily removed from the solid surface by merely lifting it from the surface. In a continuous process this step could easily be accomplished by rolling up the material on a collection drum. The material is inverted to place the skin layer on top because, when the skin layer is removed, the suede finish appears thereunder, integrally connected to the lower poromeric anchor layer.

The skin layer is removed most simply by peeling it by hand from the suede layer to which it is loosely bound. In a piece of material, produced by this process, having a subjectively determined good suede finish and a good skin layer as described earlier, the skin layer is as easy to peel from the suede layer as it is to peel skin from a ripe banana. As the skin layer becomes of poorer quality, it adheres more tightly to the suede layer so that it is torn apart as it is removed and eventually reaches the point where it cannot be removed by hand and must be removed by skiving or buffing. In a continuous process, a good skin layer may be removed from the suede layer by merely rolling it up on a collector drum.

Drying of the material may be accomplished in many ways such as air drying, oven drying, or vacuum drying. Care must be exercised to insure that the factors of drying, such as temperature and dwell time, are not increased to a level that will damage the material. Generally, the polyurethane-polyvinyl chloride copolymers of this invention have degradation temperatures in excess of 350° F. so that drying may be accomplished below this temperature. In this drying step, the volatile constituents of the phase-invertible polymer solution and the liquids picked up in the phase-inversion step are removed leaving a substantially dry, flexible poromeric sheet material with a suede finish.

It should be noted that the order of the steps of removing the material from the solid surface, inverting it, removing the skin layer, and drying it may be changed without changing the final product. For instance, the material may be dried on the solid surface prior to removing it, inverting it, etc. This is a more difficult way to dry the material because the volatile constituents are slow in leaving the side adjacent the solid surface because of the impervious nature and thickness of most surfaces. The material may be removed from the surface and dried prior to removing the skin layer, however, this contemplates drying of the skin and since the skin is to be discarded, this would represent wasteful drying of scrap. By far the best approach is to remove the material from the solid surface, invert it, and remove the skin layer before drying the remaining material because the solid surface is detached early (for instant reuse) and the skin layer is not needlessly dried before being scrapped.

A separate embodiment of this process of making flexible poromeric sheet material with a suede finish is a modification wherein, following the phase-inversion step, i.e. where the cast film of phase-invertible polymer solution is placed in the liquid, comprising a major amount of water and containing a surface-active agent, the formed material is washed in another liquid comprising a major amount of water but without a surface active agent. This separate wash insures a more complete removal of the water-miscible solvent of the phase-invertible polymer solution and produces a stronger suede-finished material. As in the phase-inversion step, there is a time-temperature relationship involved in this subsequent wash step. It has been found that temperatures from above room temperature to below the boiling point of water insure a quick removable of the last vestiges of the water-miscible solvent from the material and is the preferred temperature range whereas temperatures lower than room temperature down to about the freezing point of water reduce the mobility of the water and inhibit the solvent removal ability of this step and thus is not the preferred temperature range.

The liquid used in this step need not contain a surface-active agent as its presence will not help or hinder further phase inversion or the development of the skin layer. The liquid may contain other water-miscible liquids such as methyl alcohol, ethyl alcohol, acetone, and residual water-miscible solvent from the phase-invertible polymer solution however a concentration of the residual water-miscible solvent greater than about 5 percent permits some of this solvent to reenter the suede layer resulting in suede structure collapse. By "collapse" is meant that the previously formed closely packed, elongated, tubular-shaped cells in the suede layer soften and collapse into a substantially smooth surface—removing the suede finish from the material. Thus in this subsequent step, the concentration of water-miscible solvent from the phase-invertible polymer solution should be controlled at less than about 5 percent by weight of the liquid.

Dried poromeric suede-finished material produced either by the basic process or by the process involving the separate embodiment of a subsequent wash step may be buffed if desired such as by an abrasive surface or drum to reduce the thickness of the material's dry gauge or in other words produce a shallower synthetic suede structure. This step is optional in the production of the material of this invention because a perfectly suitable poromeric suede-finished material is produced without this buffing step. Following the skin removal and drying steps and, if desired, the buffing step disclosed above, the poromeric suede-finished material of this invention may be laminated to a fabric to produce a stronger material.

Lamination of a poromeric sheet material, such as that produced by the process of this invention, to a fabric produces a product known in the art as a "supported" film or sheet. The fabrics used in the lamination may be of natural or synthetic fibers and further may be woven or nonwoven. Generally, the lamination is accomplished by spreading a thin coating of adhesive over the surface of the anchoring layer and thereafter pressing a layer of fabric into intimate contact therewith. If the adhesive layer is maintained thin enough, the suede-finished material will remain poromeric; however, most adhesives are not poromeric per se and their use on a poromeric material decreases the poromeric nature, i.e. the moisture vapor transmission rate, of the final product.

Another separate embodiment in the process of this invention is a modification to the basic process wherein, following the step of casting a film of the phase-invertible polymer solution onto a solid surface, a layer of fabric is placed in intimate contact with the surface of the film and pressed into the wet layer slightly so that some of the polymer solution rises up into the fabric to lock the fabric. Upon phase-inversion, skin removal and drying and/or with the use of the separate embodiment of the subsequent wash in a liquid comprising a major amount of water, a supported material will be produced that does not require the use of an adhesive layer. The same fabrics, i.e. natural and synthetic, woven, and nonwoven, disclosed above, may be utilized in this embodiment.

The product produced by the process of this invention comprises a flexible poromeric sheet material with a suede finish. This material, produced in an inverted condition, is poromeric, flexible, hard wearing, and usable in a wide variety of end products. Following are examples given to point out to one skilled in the art how to practice this invention, to exhibit the range of products made by this process, to demonstrate the efficacy of the process and products therefrom, to indicate the ease with which the process may be practiced and to show the limits of certain variables involved in the process. These examples are not to be construed either singly or in combination as placing a limitation on the invention as the bounds of the invention are measured by the claims which follow the examples.

The moisture vapor transmission rates (MVTR) in these examples have been determined by the use of a testing procedure described in ASTM Standard E96-53T. All percentages and all parts listed in the examples are percentages by weight and parts per 100 parts of polymer respectively unless otherwise noted.

EXAMPLE 1

A phase-invertible polymer solution was prepared according to the formulation listed below:

| INGREDIENTS | AMOUNTS |
| --- | --- |
| Dimethyl formamide | 461.0 parts |
| Polyvinyl chloride resin (IV=0.95) | 25.0 parts |
| Carbon black | 4.0 parts |
| Water | 5.0 parts |
| Polybutylene adipate | 70.0 parts |
| Diphenylmethane-4',4 diisocyanate | 30.0 parts |
| Propene diamine | * |

*Added in amounts necessary to achieve desired viscosity of the solution by chain lengthening the polyurethane.

The solutions were prepared by ball milling part of the solvent, polyvinyl chloride resin, and the carbon black into a slurry, separately reacting the polybutylene adipate and diphenylmethane -4', 4 diisocyanate to form a polyurethane, combining the slurry and reaction mixture (polyurethane) together with the balance of the solvent, polyvinyl chloride resin, and the water, and then adding propene diamine to chain extend the polyurethane until the desired viscosity (between about 10,000 to about 75,000 centipoise) was obtained.

Thereafter, the solution was cast in a film onto a glass plate in a wet gauge of 45 mils, placed in a 90° F. liquid comprising a major amount of water and containing 0.5 percent of a nonionic silicone-based surfactant known in the trade as L-540*

* copolymer of polydimethyl siloxane and polyoxyalkylene, Union Carbide Corporation. to form a flexible, three-layered sheet material comprising a skin layer adjacent the glass plate, a poromeric suede layer loosely bound to the skin layer, and a poromeric anchoring layer atop and integral with the suede layer. The phase-inverted layer was then removed from the glass plate, inverted, the skin layer peeled away, and dried in an oven at 250° F. for 1 hour. Below in table 1 is listed the physical properties of this poromeric suede-finished material produced in this example.

TABLE 1

| | |
| --- | --- |
| Tensile Strength p.s.i. | 213 |
| % Elongation | 133.2 |
| Ford Scuff (cycles to failure) | 200 |
| Taber abrasion (% weight loss for 1000 cycles) | 0 |
| MVTR | 9200 g./100 m.²/hr. |

This example shows the basic process of this invention, demonstrates the development of the inverted poromeric suede-finished material, shows the development of the skin layer adjacent the releasable substrate, and demonstrates that once the loosely bound covering skin is removed there is produced a flexible poromeric sheet material with a suede finish.

EXAMPLE 2

A phase-invertible polymer solution corresponding to the formulation of example 1, was cast in a series of films of different wet gauges and processed as described in example 1. In table 2 below is listed the wet gauges and opposite a subjective determination of the type of suede structure produced.

TABLE 2

| Wet Gauge Cast (inches) | Type of Suede Structure |
| --- | --- |
| 0.015 | Loose skin layer, very fine cell |
| 0.030 | Loose skin layer, very fine cell |
| 0.045 | Loose skin layer, medium cell |
| 0.060 | Loose skin layer, medium cell |
| 0.75 | Loose skin layer, slight edge shrinkage |
| 0.090 | Loose skin layer, noticeable edge shrinkages |

This example demonstrates that at a thin wet gauge there is produced a very fine cell structure in the suede material and that at a thick wet gauge there appears noticeable shrinkage along the edge of the material. This example also shows that the usable wet gauge lies less than about 15 mils to greater than about 90 mils with the preferred wet gauge between about 40 mils to about 80 mils.

EXAMPLE 3

A phase-invertible polymer solution, corresponding to the formulation of example 1, was cast in a 40 mil wet gauge film onto a solid surface and thereafter placed in a liquid, comprising a major amount of water and 0.5 percent of the nonionic silicone-based surfactant known as L-540 (described earlier), at a temperature of 90° F. for various dwell times. Table 3 below lists the various dwell times along with a subject determination of the type of structure ultimately produced by the process.

TABLE 3

| Phase-Inversion Bath Dwell Times | Type of Structure |
| --- | --- |
| 0.5 minutes | Tight skin layer, no suede structure |
| 1.0 minutes | Tight skin layer, poor suede structure |
| 1.5 minutes | Loose skin layer, good suede structure |
| 2.0 minutes | Loose skin layer, good suede structure |
| 2.5 minutes | Loose skin layer, good suede structure |
| 3.5 minutes | Loose skin layer, good suede structure |
| 4.5 minutes | Loose skin layer, good suede structure |
| 6.0 minutes | Loose skin layer, good suede structure |
| 10 minutes | Loose skin layer, good suede structure |
| 20 minutes | Loose skin layer, good suede structure |
| 30 minutes | Loose skin layer, good suede structure |
| 60 minutes | Loose skin layer, good suede structure |

This example shows that the dwell time in the phase-inversion step must be of sufficient length to allow the water to combine with the water-miscible solvent and remove it from the cast film of polymer solution to produce the pormeric suede-finished material of this invention. As shown, for the surface-active agent L-540 at 90° F., the minimum dwell time is about 1.5 minutes, there being no maximum dwell time. At a higher bath temperature, the dwell time could be reduced; conversely, at a lower bath temperature, the minimum dwell time would necessarily be increased.

EXAMPLE 4

A phase-invertible polymer solution, corresponding to the formulation of Example 1, was prepared and cast in a 40 mil film according to the process disclosed in example 1. The cast film was placed in a liquid comprising a major amount of water and containing 0.5 percent of the surface-active agent L-540. The dwell time was held constant at 5 minutes and the temperature of the liquid was varied for each sample. Table 4 below lists the various temperatures of the phase-inversion liquid, a subjective determination of the type of structure produced, and some physical properties on one sample of the finished material.

TABLE 4

| Phase-Inversion Liquid Temperature | Type of Structure |
| --- | --- |
| 40° F. | Tight skin layer, poor suede structure |
| 50° F. | Tight skin layer, poor suede structure |
| 60° F. | Loose skin layer, poor suede structure |
| 70° F. | Loose skin layer, good suede structure |
| 80° F. | Loose skin layer, good suede structure |
| 90° F. | Loose skin layer, good suede structure |
| 100° F. | Tight skin layer, good suede structure |
| 110° F. | Tight skin layer, poor suede structure |
| 120° F. | Tight skin layer, poor suede structure |

Physical Properties Of Sample Phase-Inverted At 90° F.

| | |
| --- | --- |
| MVT (g./100 m.²/hr.) | 9800 |
| Tensile strength (p.s.i.) | 200 |
| Elongation (%) | 129 |

This example shows that for each surfactant and each dwell time, there is a range of temperatures that will produce a loose skin and a good suede structure. Outside of this range, either the skin will tighten to the suede layer or the suede structure will deteriorate or both. This example further demonstrates that with this specific surface-active agent, i.e. L-540, and a dwell time of 5 minutes, the liquid temperature necessary to produce a loose skin and good suede structure ranges from about 70° F. to about 90° F.

EXAMPLE 5

A phase-invertible polymer solution, corresponding to the formulation of example 1, was prepared and cast in a 60-mil wet gauge film onto a release-paper carrier. Thereafter the film was placed in a liquid, comprising a major amount of water and containing 1 percent of different surface-active agents, the liquid temperature was held constant at 140° F. and the dwell time was held constant at 30 minutes. Table 5 lists the different surface-active agents, a subjective determination of the type of structure ultimately produced, and some physical properties of two of the samples.

TABLE 5

| Sample | Surfactant | Type of Structure |
| --- | --- | --- |
| | Nonionic | |
| A | Octyl phenoxy polyethoxy ethanol w/9 moles ethylene oxide | Loose skin layer, good suede structure |
| B | Polyoxyethylene sorbitan monoleate w/10 moles ethylene oxide | Loose skin layer, good suede structure |
| C | Polyethylene oxide | Loose skin layer, good suede structure |
| D | Copolymer of polydimethyl siloxane acid polyoxyalkylene | Loose skin layer, good suede structure |
| | Anionic | |
| E | Sodium stearate | Slightly tight skin layer, good suede structure |
| F | Sodium diocyl sulfosuccinate | Slightly tight skin layer, suede structure |
| G | Sodium lauryl sulfate | Loose skin layer, good suede structure |
| H | Sodium dodecyl benzene sulfonate | Loose skin layer, good suede structure |
| I | Ethyl naphthalene sulfonic acid | Loose skin layer, good suede structure |
| | Catonic | |
| J | Cetyl trimethyl ammonium bromide | Slightly tight skin layer, good structure |
| K | Cetyl dimethyl amine oxide | Tight skin layer, good structure |

| | Amphoteric | |
|---|---|---|
| L | Sodium salt of a stearic acid substituted quaternary hydroxycloi-midine acid alcoholate | Tight skin layer, good suede structure |
| M | N-Coco beta amino butyric acid | Tight skin layer, poor suede structure |

| Sample | C | H |
|---|---|---|
| MVT (g./100 m.²/hr.) | 9400 | 9100 |
| Tensile strength | 235 | 311 |
| Elongation | 121 | 167 |
| Taber Abrasion (% weight loss for 1000 cycles) | | 0 |
| Ford Scuff (cycles to failure) | | 416 |

This example shows that nonionic, anionic, and catonic surface-active agents produce an acceptable structure with an acceptable skin layer whereas amphoteric surface-active agents produce only a marginal product.

EXAMPLE 6

A phase-invertible polymer solution, corresponding to the formulation of example 1, was prepared and cast in a 60-mil wet gauge film and processed as described in example 1. The cast film was placed in a phase-inversion liquid, comprising a major amount of water and various concentrations of the nonionic silicone-based surface-active agent L–540, the liquid temperature held constant at 140° F. The dwell time was held constant at 30 minutes in each test. Table 6 below shows the different concentrations of L–540 surface-active agent, a subjective determination of the type of structure produced, and some physical properties of two samples.

TABLE 6

| Sample | L-540 Concentration % | Type of Structure |
|---|---|---|
| A | 0.5 | Loose skin layer, good cell structure |
| B | 1.0 | Loose skin layer, good cell structure |
| C | 2.0 | Loose skin layer, good cell structure |
| D | 2.5 | Loose skin layer, good cell structure |
| E | 3.5 | Loose skin layer, good cell structure |
| F | 4.0 | Slightly tight skin layer, good cell structure |
| G | 4.5 | Slightly tight skin layer, good cell structure |
| H | 5.0 | Slightly tight skin layer, good cell structure |
| I | 6.5 | Slightly tight skin layer, good cell structure |
| J | 7.0 | Slightly tight skin layer, good cell structure |
| K | 8.0 | Tight skin layer, fair cell structure |
| L | 10.0 | Tight skin layer, fair cell structure |
| M | 15.0 | Tight skin layer, fair cell structure |
| N | 20.0 | Tight skin layer, fair cell structure |
| O | 25.0 | Tight skin layer, fair cell structure |
| P | 30.0 | Tight skin layer, poor cell structure |

| Sample | C | F |
|---|---|---|
| MVT (g./100 m.²/hr.) | 9800 | 9800 |
| Tensile Strength (p.s.i.) | 212 | 214 |
| Elongation (%) | 120 | 113 |
| Taber Abrasion (% weight loss for 1000 cycles) | 0 | 0 |
| Ford Scuff (cycles to failure) | 523 | 549 |

This example demonstrates that with this particular surface-active agent the range of concentration of the agent necessary to produce both a loose skin layer and a good cell structure is from about 0.5 percent to about 3.5 percent; from about 4.0 percent to about 8.0 percent the structure is acceptable and from about 8.0 percent to about 25 percent the structure is marginal.

EXAMPLE 7

A phase-invertible polymer solution, corresponding to the formulation of example 1, was prepared and cast in a 60 mil wet gauge film. The cast film was placed in a phase-inversion liquid, comprising a major amount of water, different concentrations of L–540 surface-active agent, and different amounts of water-miscible liquids such as dimethyl formamide, methyl alcohol, and acetone. Table 7 lists the concentrations of these surface-active agents and water-miscible liquids, a subjective determination of the type of structure ultimately produced, and some physical properties of three of the samples. The phase-inversion liquid temperature was held constant at 140° F. and the dwell time was held constant at 5 minutes.

TABLE 7

| Sample | Water-miscible liquid | Water-miscible liquid concentration, percent | L-540 concentration, percent | Type of structure |
|---|---|---|---|---|
| A | Dimethyl formamide | 5.0 | 0.5 | Loose skin layer, good cell structure. |
| B | do | 11.0 | 0.5 | Do. |
| C | do | 18.0 | 0.5 | Tight skin layer, good cell structure. |
| D | do | 0 | 10.0 | Do. |
| E | Methyl alcohol | 5.0 | 0.5 | Loose skin layer, good cell structure. |
| F | Acetone | 5.0 | 0.5 | Do. |

| Sample | A | E | F |
|---|---|---|---|
| MVT (g./100 m.²/hr.) | 8,700 | 8,200 | 7,500 |
| Tensile strength (p.s.i.) | 207 | 250 | 306 |
| Elongation (percent) | 98 | 110 | 137 |

This example shows that the addition of other water-miscible liquid to the phase-inversion liquid, at minor concentrations, does not affect the type of structure produces in the process. This example also shows that concentrations of water-miscible solvent from the phase-invertible solution (dimethyl formamide) above about 18 percent has a deteriorating effect on the structure ultimately produced.

EXAMPLE 8

A phase-invertible polymer solution, corresponding to the formulation of example 1, was prepared and cast in a 40-mil wet gauge film upon a release paper and processed as described in example 1 except that following the phase-inversion step in the liquid, comprising a major amount of water and about 0.5 percent of L–540, the phase-inverted material was placed in another liquid comprising a major amount of water but without a surface-active agent for 30 minutes at 110° F. In table 8 below is listed the physical properties of the product produced by this separate embodiment of the basic process and also a subjective determination as to the type of structure produced.

TABLE 8

| | |
|---|---|
| Tensile Strength (p.s.i.) | 220 |
| % Elongation | 140 |
| Ford Scuff (cycles to failure) | 250 |
| Taber Abrasion | 1000 cycles— no weight loss |
| MVTR | 9500 g./100 m.²/hr. |
| Structure | Good suede structure w/loose skin layer |

This example shows that the product produced by this process is slightly superior in physical properties to that obtained by the basic process (see table 1) and the type of structure producted is equally as good. The example also shows that the poromeric suede structure is formed in the phase-inversion bath and later soaking or rinsing does not affect it.

EXAMPLE 9

A phase-invertible polymer solution, corresponding to the formulation of example 1, was prepared and cast in a 60-mil wet gauge film onto a smooth, stainless steel conveyor belt. After phase-inversion in the liquid comprising a major amount of water and 0.5 percent by weight of L–540 surface-active agent, at 90° F. for 20 minutes, the material was rinsed in a separate liquid comprising a major amount of water but without a surface active agent at 140° F. for 15 minutes. This latter rinse liquid contained various water-miscible liquids in various concentrations. In table 9 below is a list of the water-miscible liquids, their concentrations, the type of structure ultimately produced by the process, and some physical properties of one sample of the finished material.

TABLE 9

| Acetone | Isoproponal | Dimethyl Formamide |
|---|---|---|
| Water-Miscible Liquid Concentration (%) 5 | 5 | 5 |
| Type of Structure Loose skin layer, good structure | Loose skin layer, good structure | Loose skin layer, poor structure |
| MVT (g./100 m.²/hr.) 9800 | | |
| Tensile Strength (p.s.i.) 160 | | |
| Elongation (%) 100 | | |

This example shows that the rinse bath may contain various water-miscible liquids in various minor concentrations without damage or effect on the suede structure ultimately produced by the process of this invention. This example also shows that phase-invertible polymer solution water-miscible solvent of greater than 5 percent has a deteriorating effect on the suede structure ultimately produced.

EXAMPLE 10

Example 8 was repeated except that the temperature of the liquid used in the rinse step, subsequent to the phase-inversion step and the dwell time were varied. Below in table 10 are listed the liquid temperatures and dwell times along with a subjective determination of the type of structure ultimately produced.

TABLE 10

| Rinse Bath Temperature | Rinse Bath Dwell Time | Type of Structure |
|---|---|---|
| 40° F. | 15 minutes | Loose skin layer, good suede structure |
| 60° F. | 15 minutes | Loose skin layer, good suede structure |
| 80° F. | 15 minutes | Loose skin layer, good suede structure |
| 100° F. | 15 minutes | Loose skin layer, good suede structure |
| 120° F. | 15 minutes | Loose skin layer, good suede structure |
| 140° F. | 15 minutes | Loose skin layer, good suede structure |
| 150° F. | 15 minutes | Loose skin layer, good suede structure |
| 170° F. | 15 minutes | Loose skin layer, good suede structure |
| 190° F. | 15 minutes | Loose skin layer, good suede structure |
| 160° F. | 30 minutes | Loose skin layer, good suede structure |
| 160° F. | 45 minutes | Loose skin layer, good suede structure |
| 160° F. | 60 minutes | Loose skin layer, good suede structure |
| 200° F. | 120 minutes | Loose skin layer, good suede structure |

This example shows that the temperature of the liquid may vary from just above the freezing point of water to just below the boiling point of water and the dwell time may vary from less than 15 minutes to greater than 2 hours without effect on the type of suede structure and formation of skin layer ultimately produced.

What is claimed is:

1. A process of making a flexible poromeric material with a suede finish comprising the steps of:
    a. casting a film of a phase-invertible polymer solution, comprising an extended urethane polymer, a polyvinyl chloride resin, and a water-miscible solvent, onto a solid surface;
    b. phase-inverting said film of polymer solution in a liquid, comprising a major amount of water and containing from about 0.5 percent to about 25 percent by weight of a surface-active agent, to form a flexible, three-layered sheet comprising a skin layer adjacent said surface, a poromeric suede layer loosely bound to said skin layer, and a poromeric anchoring layer atop and integral with said suede layer;
    c. removing said three-layered sheet from said surface;
    d. removing said skin layer from said suede layer to leave a flexible, two-layered poromeric sheet material with a suede finish; and,
    e. drying said material.

2. A process of making a flexible poromeric sheet material with a suede finish, as described in claim 1, wherein the step of phase-inverting said film in a liquid, comprising a major amount of water and containing from about 0.5 percent to about 25 percent by weight of a surface-active agent, is followed by the subsequent step of placing said phase-inverted material in a liquid comprising a major amount of water but without a surface-active agent, to obtain a more complete removal of water-miscible solvent from said material.

3. A process of making a flexible poromeric sheet material with a suede finish, as described in claim 1, wherein the viscosity of the said phase-invertible polymer solution is between about 10,000 to about 75,000 centipoise.

4. A process of making a flexible poromeric sheet material with a suede finish, as described in claim 1, wherein the wet gauge of said cast film of phase-invertible polymer solution is from about 15 mils to about 90 mils.

5. A process of making a flexible poromeric sheet material with a suede finish, as described in claim 4, wherein said wet gauge of said cast film of phase-invertible polymer solution is from about 40 mils to about 65 mils.

6. A process of making a flexible poromeric sheet material with a suede finish, as described in claim 1, wherein the temperature of said phase-inversion liquid is between about 40° F. to about 160° F.

7. A process of making a flexible poromeric sheet material with a suede finish as described in claim 1, wherein the temperature of said phase-inversion bath is between 70° F. to about 90° F.

8. A process of making a flexible poromeric sheet material with a suede finish as described in claim 1, wherein said surface-active agent is selected from the group consisting of: nonionic agents, anionic agents, cationic agents, and amphoteric agents.

9. A process of making a flexible poromeric sheet material with a suede finish as described in claim 1, wherein said surfactants are selected from the group consisting of: nonionic agents, anionic agents, and cationic agents.

10. A process of making a flexible poromeric sheet material with a suede finish, as described in claim 1, wherein said concentration of said surface-active agent in said phase-invertible liquid is from about 0.5 percent to about 8.0 percent by weight.

11. A process of making a flexible poromeric sheet material with a suede finish, as described in claim 1, wherein said step of removing said loosely bound skin layer is followed by the subsequent step of buffing said suede layer to decrease the dry gauge of said material.

12. A process of making a flexible poromeric sheet material with a suede finish, as described in claim 1, wherein said phase-inversion liquid comprising a major amount of water and containing from about 0.5 percent to about 25 percent of a surface-active agent, contains less than about 18 percent by weight of water-miscible solvent from said phase-invertible polymer solution.

13. A process of making a flexible poromeric sheet material with a suede finish, as described in claim 1, wherein said step of removing said skin layer is followed by the subsequent step of laminating a fabric to said substantially smooth anchoring layer of said material.

14. A process of making a flexible poromeric sheet material with a suede finish, as described in claim 2, wherein said step of removing said skin layer includes is followed by the subsequent step of laminating a fabric to said substantially smooth anchoring layer of said material.

15. A process of making a flexible poromeric material with a suede finish comprising the steps of:
 a. casting a film of a phase-invertible polymer solution, comprising an extended urethane polymer, a polyvinyl chloride resin, and a water-miscible solvent, onto a solid surface;
 b. phase-inverting said film of polymer solution in a liquid, comprising a major amount of water and containing from about 0.5 percent to about 25 percent by weight of a surface-active agent, to form a flexible, three-layered sheet comprising a skin layer adjacent said surface, a poromeric suede layer loosely bound to said skin layer, and a poromeric anchoring layer atop and integral with said suede layer;
 c. removing said three-layered sheet from said surface;
 d. drying said material; and,
 e. removing said skin layer from said suede layer to leave a flexible, two-layered poromeric sheet material with a suede finish.